United States Patent [19]
Ouchi

[11] Patent Number: 4,905,174
[45] Date of Patent: Feb. 27, 1990

[54] OPTICAL COORDINATE INPUT APPARATUS

[75] Inventor: Junichi Ouchi, Furukawa, Japan

[73] Assignee: Alps Electric Co., Ltd., Tokyo, Japan

[21] Appl. No.: 199,006

[22] Filed: May 26, 1988

[30] Foreign Application Priority Data

Sep. 7, 1987 [JP] Japan .................................. 62-223770

[51] Int. Cl.[4] ...................... G06F 13/00; G09G 3/02; G08C 21/00
[52] U.S. Cl. ............................. 364/709.11; 340/712; 341/5; 178/18
[58] Field of Search ...................... 364/709.11, 709.09; 178/18; 340/712; 341/5, 24

[56] References Cited

U.S. PATENT DOCUMENTS

| | | | |
|---|---|---|---|
| 4,313,109 | 1/1982 | Funk et al. | 178/18 |
| 4,476,463 | 10/1984 | Ng et al. | 178/18 |
| 4,672,558 | 6/1987 | Beckes et al. | 364/518 |
| 4,684,801 | 8/1987 | Carroll et al. | 340/712 |
| 4,710,759 | 12/1987 | Fitzgibbon | 178/18 |
| 4,761,637 | 8/1988 | Lucas et al. | 341/5 |
| 4,801,797 | 1/1989 | Ohouchi et al. | 341/5 |
| 4,812,642 | 3/1989 | Hasegawa et al. | 341/5 |
| 4,845,346 | 7/1989 | Ouchi et al. | 340/712 |

Primary Examiner—Gary V. Harkcom
Assistant Examiner—Dale M. Shaw
Attorney, Agent, or Firm—Guy W. Shoup; Paul J. Winters

[57] ABSTRACT

In an optical coordinate input apparatus, an insect or mud may disturb optical coordinate input operation for a main computer. To avoid such a problem, light emitting element arrays and light receiving element arrays are arranged opposite to each other, a pair of these light emitting element and light receiving element are sequentially driven by a multiplexer, and a coordinate signal is output by a signal detecting device when an optical signal derived from the driven light emitting element cannot be received by the light receiving element positioned opposite to this driven light emitting element. Furthermore, a memory unit is employed to store the coordinate signal. A comparison is made by a coordinate signal comparing device whether or not the previous coordinate signal stored in this memory unit is equal to a coordinate signal newly output from the signal detecting device, and when the equal coordinate signals are continuously detected by the coordinate signal comparing device at a predetermined number, an error signal is output from an error output device.

1 Claim, 2 Drawing Sheets

OPTICAL COORDINATE INPUT APPARATUS

BACKGROUND OF THE INVENTION

1. Field of the Invention

The present invention relates to an optical coordinate input apparatus for outputting an error signal when any one of light emitting element arrays and light receiving element arrays is covered with an insect, mud, or electronically broken down.

2. Description of the Prior Art

In general, an optical coordinate input apparatus is arranged in front of an image display device such as a CRT (cathode-ray-tube) display and an LCD (liquid crystal diode), and employed to input coordinates into a microcomputer. Such an optical coordinate input apparatus is arranged as follows. Light emitting element arrays are positioned opposite to light receiving element arrays in an X-axis direction and a Y-axis direction at a peripheral portion of a screen of an CRT display or the like. These light emitting elements and light receiving elements are sequentially and selectively driven and scanned by way of a multiplexer means. Then, when optical signals output from the light emitting elements which are driven and scanned, cannot be received by the light receiving elements positioned opposite to the light emitting elements due to the fact that the optical signals are interrupted by a finger or the like as a coordinate input operation, a coordinate signal representative of the position where this optical signal is interrupted, is output and then a coordinate input can be obtained by a microcomputer or the like by way of calculation processing.

As a result, when the coordinate input operation by way of a finger or the like is performed, the specific coordinate inputs in the X-Y coordinate system can be obtained by executing the calculation by the microcomputer based upon the coordinate signals in the respective X-axis direction and Y-axis direction in such a manner that the optical signals in both the X-axis and Y-axis directions are interrupted. If any one of these light emitting element array and light receiving element array in either X-axis or Y-axis direction is covered with an insect or mud, otherwise electronically broken down, only one coordinate signal is output and thus, the microprocessor will judge occurrence of an error.

In the conventional optical coordinate input apparatus, if the plane where the light emitting element arrays and the light receiving element arrays are arranged in the respective X-axis and Y-axis directions, is coincident with the Z-axis direction, both the optical signals in the X-axis and Y-axis directions are interrupted by an insect having a short body length. As a consequence, there is a risk that the microcomputer will judge the normal coordinate input operation under this condition.

To avoid such a conventional drawback, the plane where the light emitting element arrays and light receiving element arrays are arranged, is arranged with having positional shifts of the X-axis and Y-axis directions with respect to the Z-axis direction. Accordingly, both the optical signals in the X-axis and Y-axis directions are not interrupted by an insect or the like having a short body length. Such a conventional optical coordinate input apparatus is disclosed in Japanese patent KOKAI (Disclosure) No. 57-139606 (1982).

When any one of the optical signals in the X-axis direction or Y-axis direction is interrupted in the above-described conventional optical coordinate input apparatus, occurrence of an error is judged by properly processing the coordinate signals in the microcomputer. As described above, since the microcomputer is also utilized so as to judge the occurrence of an error, there is another drawback that the throughput of the microcomputer is deteriorated under the condition that this microcomputer is utilized for controlling the operations of other controlling devices.

SUMMARY OF THE INVENTION

An object of the present invention is therefore to solve the above-described problems of the prior art optical coordinate input apparatus, and to provide an optical coordinate input apparatus capable of judging occurrence of an error without the calculation process for the coordinate signals by the microcomputer.

To achieve the above-identified object of the invention, an optical coordinate input apparatus, according to the invention, wherein light emitting element arrays and light receiving element arrays are arranged opposite to each other, a pair of these light emitting element and light receiving element are sequentially driven by a multiplexer means, and a coordinate signal is output by a signal detecting means when an optical signal derived from the driven light emitting element cannot be received by the light receiving element positioned opposite to this driven light emitting element, is characterized in that a memory means is employed to store said coordinate signal, a comparison is made by a coordinate signal comparing means whether or not the previous coordinate signal stored in this memory means is equal to a coordinate signal newly output from said signal detecting means, and when the equal coordinate signals are continuously detected by said coordinate signal comparing means at a predetermined number, an error signal is output from an error output means.

According to the optical coordinate input apparatus of the present invention, when one of the light emitting element arrays and light receiving element arrays is covered with an insect, mud or the like, otherwise electronically broken down, the same coordinate signal either in the X-axis direction, or in the Y-axis direction every time the light emitting element arrays and light receiving element arrays are driven and scanned, is repeatedly output. Then, a judgement is made whether or not the coordinate signal previously stored in the memory means is equal to the coordinate signal newly output. If a judgement is made such that the previous coordinate signal is continuously equal to each of the coordinate signals newly output at a predetermined number, it can be judged that due to the above-described cause, an error occurs. As a result, the microcomputer is no longer required to perform the calculation of the coordinate signals, resulting in a judgement of occurrence of an error.

BRIEF DESCRIPTION OF THE DRAWINGS

For a better understanding of the above-described object of the present invention, reference is made to the following detailed description of the invention to be read in conjunction with the following drawings, in which.

DETAILED DESCRIPTION OF THE PREFERRED EMBODIMENTS

Figure 1:
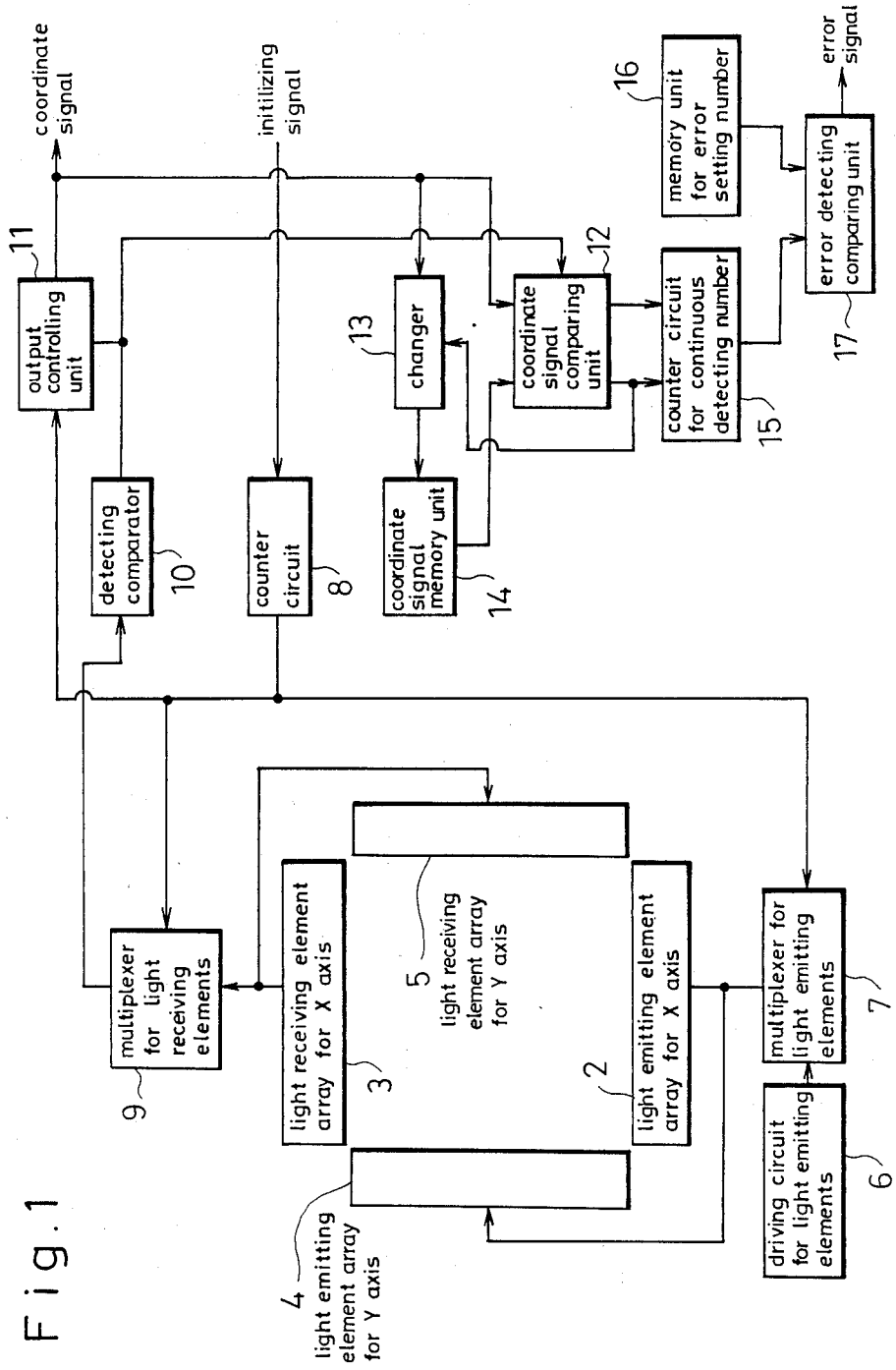
FIG. 1 is a schematic block diagram of an optical coordinate input apparatus according to one preferred embodiment of the invention; and, FIG. 2 is a perspective view of the optical coordinate input apparatus shown in FIG. 1.
Figure 2:
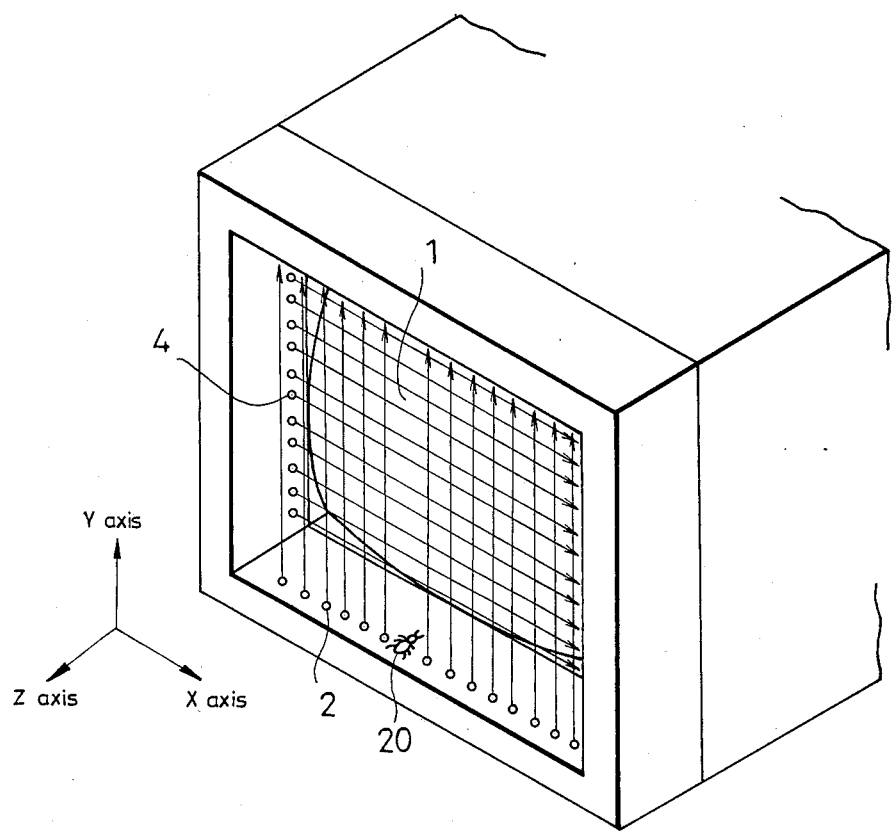

Referring now to FIGS. 1 and 2, one preferred embodiment of the present invention will be described in detail. FIG. 1 is a block diagram of an optical coordinate input apparatus according to one preferred embodiment of the present invention. FIG. 2 is a perspective view of the optical coordinate input apparatus as illustrated in FIG. 1.

In FIGS. 1 and 2, a light emitting element array 2 for an X-axis is arranged in an X-axis direction along upper and lower edges of an outer peripheral portion of a front screen surface of a CRT (cathoderay-tube raytube) display 1 or the like, and a light receiving element array 3 for an X-axis is similarly arranged in the X-axis direction of the CRT display 1, opposite to the light emitting element array 2. Also, a light emitting element array 4 for a Y-axis and a light receiving element array 5 are arranged opposite to each other in a Y-axis direction of side edges of the outer peripheral portion of the CRT display 1, or the like. A plane where the above-described X-axis light emitting element array 2 and X-axis light receiving element array 3 are arranged, is so arranged with respect to another plane where the above-described Y-axis light emitting element array 4 and Y-axis light receiving element array 5, that the first-mentioned plane is shifted by, for instance, approximately 5 mm in front of the screen of the CRT display 1 in the Z-axis.

Then, a light emitting element drive signal output from a driving circuit 6 for light emitting elements, is supplied to a multiplexer 7 for light emitting elements. Based upon a counter value output from a counter circuit , a drive signal is supplied by a multiplexer 7 for light emitting elements firstly to the X-axis light emitting element array 2 and subsequently to the Y-axis light emitting element array 4, and then, these arrays are driven and scanned. A light receiving element of the X-axis light receiving element array 3 and a light receiving element of the Y-axis light receiving element array 5 are sequentially selected by a multiplexer 9 for light receiving elements based upon a counter value derived from the counter circuit 8. The light emitting element for outputting a light signal upon receipt of this driving signal is positioned opposite to the light receiving element. Thereafter, an output of the light receiving element selected by the multiplexer 9 for light receiving elements is supplied to a detector/comparator 10. Furthermore, a detector signal from the detector/comparator 10 is supplied to an output controlling unit 11 and a coordinate signal comparing unit 12. The counter value output from the counter circuit 8 is supplied to this output controlling unit 11 to store the counter value when the detector signal is supplied thereto, and this counter value is supplied to a microcomputer (not shown) as a coordinate signal, and furthermore supplied to a coordinate signal comparing unit 12 and a changer 13. Upon receipt of the detector signal the coordinate signal comparing unit 12 will judge whether or not the coordinate signal previously stored in a coordinate signal memory unit 14 is equal to a newly received coordinate signal. If the previously stored coordinate signal is not equal to the newly received coordinate signal, an incoincident comparator signal is supplied to a changer 13 so as to update the memory content of the coordinate signal memory unit 14 by a new coordinate signal. Simultaneously, a counter circuit 15 for continuous detection number is cleared. Conversely, if the previously stored coordinate signal is equal to the newly received coordinate signal, a coincident signal is supplied to the counter circuit 15 for continuous detection number so as to increment the continuous number counter value by 1. Moreover, in a error detecting/comparing circuit unit 17, this continuous number counter value of the counter circuit 15 for continuous detection number is compared with a predetermined value previously set and stored in a memory unit 16 for error setting number. Then, if the continuous number counter value is coincident with the predetermined value, an error signal is output from the error detecting/comparing unit 17 and thereafter supplied to the microcomputer.

In FIG. 1, it should be noted that means for sequentially energizing a pair of opposing elements of the light emitting element array and the light receiving element arrays are represented by the light-emitting-element driving circuit 6, the multiplexer 7, and the multiplexer 9. Means for specifying the positions of the opposing elements to be sequentially energized are represented by the counter circuit 8. Means for detecting whether the light receiving element at a specified position receives light and outputting a position value for the light receiving elements which do not receive light are represented by the detector/comparator 10 and the output controlling unit 11. Means for storing the position value of a light receiving element which does not receive light are represented by the coordinate signal memory 14. Means for comparing the stored position value with the next determined position value corresponding to a light receiving element which does not receive light are represented by the coordinate signal comparing unit 12. Means for replacing the stored position value with the next determined position value when the stored position value is not equal to the next determined position value are represented by the changer 13. Means for counting and storing the number of consecutive times the stored position value is equal to the next determining position value are represented by the counter circuit for continuous detecting number 15. And, means for comparing the stored number of consecutive times the stored position value is equal to the next determined position value with a predetermined number and outputting an error signal if the stored number of consecutive times is coincident with the predetermined number are represented by the memory unit for error setting number 16 and the error detecting comparing unit 16.

With the above-described circuit arrangement, an initializing signal derived from the microcomputer is supplied to a counter circuit 8 at a predetermined period, which will be accordingly brought into an operation condition. The counter value of the counter circuit 8 is incremented by a clock signal (not shown). Then, based upon this counter value from the counter circuit 8, both the X-axis light emitting element array 2 and the Y-axis light emitting element array 4 are successively driven by the multiplexer 7 for light emitting elements, and both the X-axis light receiving element array 3 and Y-axis light receiving element array 5 are sequentially selected by the multiplexer 9 for light receiving elements. Then, when the coordinate input operation is accomplished by this driving and scanning operation to interrupt the optical signals, the respective light receiving elements of both the X-axis light receiving element array 3 and the Y-axis light receiving element array 5 cannot receive at least one optical signal and the detector signals are derived from the respective detector/- comparator 10. As a result, the different counter values derived from the output controlling unit 11 are output as the X-axis coordinate signal and Y-axis coordinate signal to the microcomputer.

In this case, every time the detector signal is output, a judgement is made in the coordinate signal comparing unit 12 whether or not the coordinate signal previously stored in the coordinate signal memory unit 14 is equal to a new coordinate signal. If the new coordinate signal corresponds to the X-axis coordinate signal, then the previously stored coordinate signal is equal to the Y-axis coordinate signal and thus, the incoincident comparator signal is output. Then, the changer 13 is brought into the conductive condition, the memory content of the coordinate signal memory unit 14 is updated by the newly received coordinate signal, and also the counter circuit 15 for continuous detection number is cleared. Similarly, if the X-axis coordinate signal and Y-axis coordinate signal are alternately output from the output controlling unit 11 by way of the normal coordinate input operation, the coordinate signal comparing unit 12 outputs the incoincident comparator signal, accordingly. Then, the continuous number counter value of the counter circuit 15 for continuous detection number is not incremented, but also no error signal is output from the error detector/comparator unit 17.

As illustrated in FIG. 2, when, for instance, one of the light emitting elements of the X-axis light emitting element array 2 is covered with an insect 20, the same counter values of the X-axis coordinate signal are output from the output controlling unit 11 every time the initializing signal is supplied to the counter circuit 8. Under this condition, no Y-axis coordinate signal is output unless the coordinate input operation is performed. As a consequence, the coordinate signal previously stored in the coordinate signal memory unit 14 is equal to the new coordinate signal, and the coincident comparator signal supplied from the coordinate signal comparing unit 12 is furnished to the counter circuit 15 for continuous detection number so as to increment the continuous number counter value. Then, when this continuous number counter value is coincident with the predetermined value set in the error setting number memory unit 16, the error signal is output from the error detector/comparator unit 17 and then supplied to the microcomputer.

As previously described in detail, when any one of the elements among the light emitting element arrays 2 and 4, and the light receiving element arrays 3 and 5 is covered with the insect 20, mud, or the like, otherwise electronically broken, the same coordinate signals are output every time the initializing signal is supplied to the counter circuit 8, and therefore, no coordinate signal is calculated in the microcomputer so as to output the error signal.

It should be noted that in the above-described preferred embodiment, both the light emitting element arrays 2 and 4 for the X-axis and Y-axis, and the light receiving element arrays 3 and 5 for the X-axis and Y-axis are arranged in such a manner that these arrays are subsequently driven and scanned based upon a series of the counter value. However, the present invention is not limited thereto. For instance, multiplexer means and signal detector means may be employed for those in the respective X-axis and Y-axis, and moreover, a coordinate signal capable of discriminating the coordinate signal for the X-axis from one for the Y-axis may be output to be supplied to the changer 13 and coordinate signal comparing unit 12. Also, the changer 13 is employed due to the fact that after the coordinate signal previously stored in the memory unit is compared with the newly received coordinate signal in the coordinate signal comparing unit 12, the memory content of the coordinate signal memory unit 14 is updated. A proper delay means may be alternatively connected to the coordinate signal memory unit 14 so as to supply the coordinate signal via this delay means to this memory unit 14 by omitting this changer 13. In addition, a counter circuit equipped with the preset function and carry-out output may be employed as the error output means. Then, this counter circuit may be preset to a proper preset value by receiving the incoincident comparator signal supplied from the coordinate signal comparing unit 12, and may be incremented so as to output the carry-out output as the error signal by receiving the coincident comparator signal. Moreover, it is of course possible that both one plane where the X-axis light emitting element array 2 as well as the X-axis light receiving element array 3 are arranged, and another plane where the Y-axis light emitting, element array 4 and also the Y-axis light receiving element array 5 are arranged, are coincident with the Z-axis direction.

While has been described in detail, in the optical coordinate input apparatus according to the invention, if any one of the elements belonging to the light emitting element arrays and the light receiving element arrays is covered with the insect, mud or the like, otherwise electronically broken down, occurrence of the error can be judged without calculating the output coordinate signal in the microcomputer. As a result, all functions of the microcomputer are not utilized for calculating the coordinate signal output by reason of occurrence of the error. As a consequence, the particular advantages are provided that the throughput of this microcomputer which is also utilized with other controlling apparatuses can be increased.

What is claimed is:

1. An optical coordinate input apparatus, which comprises:
    at least two light emitting element arrays having a plurality of light emitting elements;
    at least two light receiving element arrays having a plurality of light receiving elements arranged opposite the light emitting elements of said light emitting element arrays;
    means for sequentially energizing a pair of opposing elements of the light emitting element arrays and the light receiving arrays;
    means for specifying the positions of the opposing elements to be sequentially energized;
    means for detecting whether the light receiving element at a specified position receives light and outputting a position value for the light receiving elements which do not receive light;
    means for storing position value of a light receiving element which does not receive any light;
    means for comparing the stored position value with the next determined position value corresponding to a light receiving element which does not receive light;
    means for replacing the stored position value with the next determined position value if the stored position value is not equal to the next determined position value;
    means for counting and storing the number of consecutive times the stored position value is equal to the next determined position value; and
    means for comparing the stored number of consecutive times the stored position value is equal to a predetermined number and outputting an error signal if the stored number of consecutive times is coincident with the predetermined number.

* * * * *